K. A. PAULY.
INDUCTION MOTOR CONTROL.
APPLICATION FILED JAN. 30, 1915.
1,215,184.
Patented Feb. 6, 1917.
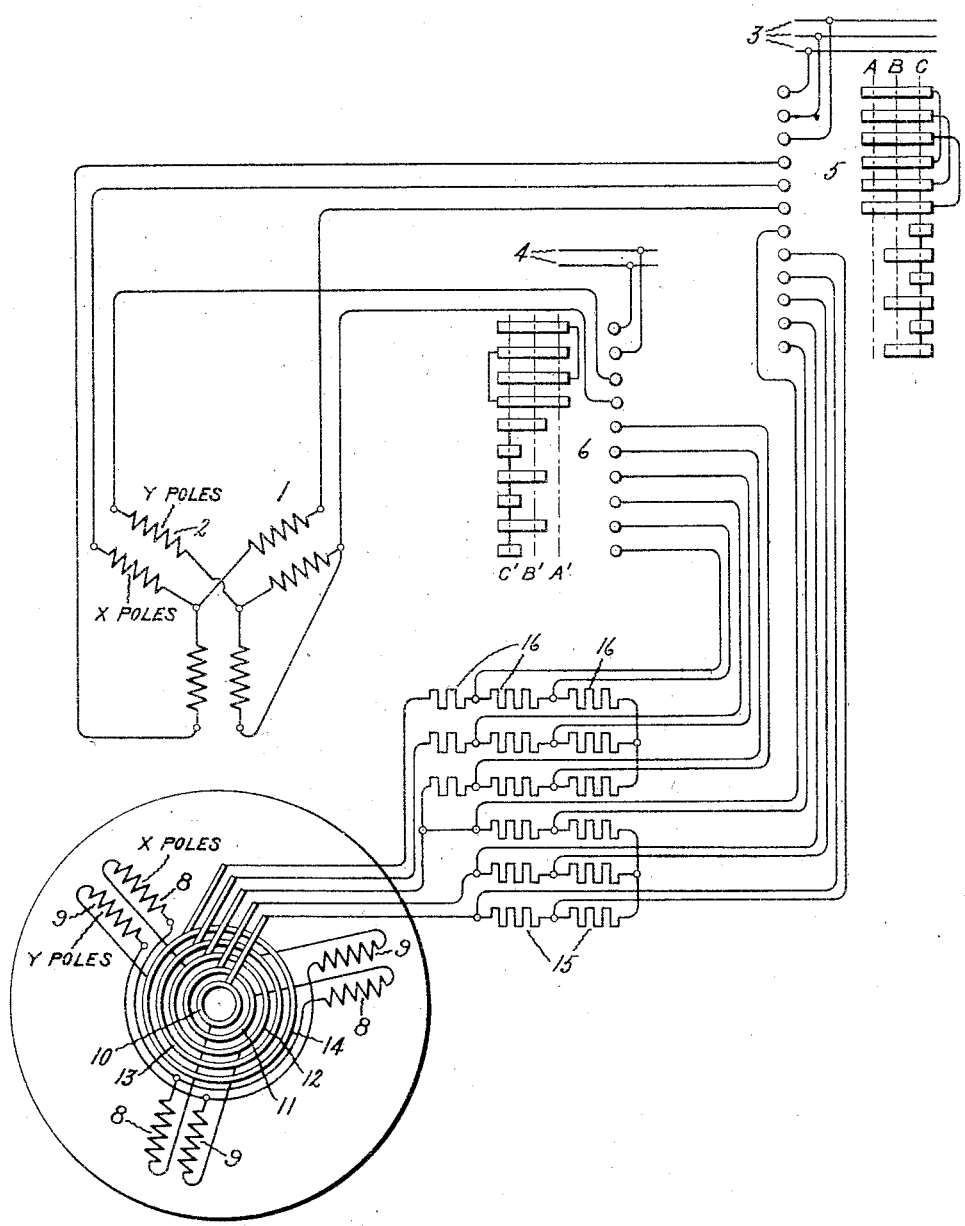
Witnesses:
Carl G. Klock.
J. Ellis Glen.
Inventor:
Karl A. Pauly,
by Albert E. Davis
His Attorney.

UNITED STATES PATENT OFFICE.

KARL A. PAULY, OF SCHENECTADY, NEW YORK, ASSIGNOR TO GENERAL ELECTRIC COMPANY, A CORPORATION OF NEW YORK.

INDUCTION-MOTOR CONTROL.

1,215,184.

Specification of Letters Patent. Patented Feb. 6, 1917.

Application filed January 30, 1915. Serial No. 5,310.

*To all whom it may concern:*

Be it known that I, KARL A. PAULY, a citizen of the United States, residing at Schenectady, county of Schenectady, State of New York, have invented certain new and useful Improvements in Induction-Motor Control, of which the following is a specification.

My invention relates to the control of induction motors and has for its object a novel method of, and means for, controlling such motors whereby electrical braking connections may be established without opening the connections of the motor to the alternating current source of supply, and consequently without the motor losing torque.

To this end, I provide the motor with two windings of different pole members, one of which is supplied with alternating current for running and the other of which is supplied with direct current when it is desired to brake the motor. The controlling means may be so operated that direct current will be supplied to the braking winding before the running winding is disconnected from the alternating current source, and if it is controlled in this way the motor will never lose its torque.

In another aspect, my invention consists in operating such a motor by supplying alternating current to one of the windings for normal running, then supplying direct current to the other of the windings during transition from running to braking, and then disconnecting the alternating current from the first mentioned winding and braking the motor by means of the last mentioned winding.

For a better understanding of my invention, reference may be had to the following description taken in connection with the accompanying drawing in which the single figure shows diagrammatically an induction motor arranged for control in accordance with my invention.

Referring to the drawing, 1 represents a primary winding connected for $x$ poles and 2 represents a second primary winding connected for $y$ poles, as for instance 8 poles and 10 poles, respectively. The particular arrangement of these windings to obtain these pole numbers forms no part of my invention and is well understood in the art. 3 is a source of alternating current and 4 is a source of direct current. The source 3 is arranged to be connected to the primary winding 1 by a controlling switch 5 and the source 4 is arranged to be connected by a controlling switch 6. Since these switches are independent, the switch 5 may be operated to connect winding 1 to the source of alternating current and at the same time the switch 6 may be operated to connect windings 2 to the source of direct current. The windings 1 and 2 are of such different pole numbers that there will be substantially no interference between them, that is, the resultant alternating electromotive force induced in winding 2 by the alternating current in winding 1 will be negligible. The motor has a secondary member which is preferably provided with two windings 8 and 9 which correspond to the primary windings 1 and 2, respectively and also have the same pole numbers as the corresponding primary windings. This arrangement of windings on the secondary member still further prevents the windings from inducing any alternating current in winding 2 through the intermediation of the secondary windings. The winding 8 is shown as being connected to collector rings 10, 11 and 12 and the winding 9 as being connected to collector rings 12, 13 and 14. A set of resistances 15 is connected to collector rings 10, 11 and 12, this set of resistances being adapted to be short-circuited in steps by the controlling switch 5. A second set of resistances 16 is connected to collector rings 12, 13 and 14 and is adapted to be short-circuited in steps by the controlling switch 6.

The motor is operated as follows:—The controlling switch 5 is first thrown into position A in which the primary winding 1 is connected to the alternating current source 3, the secondary winding 8 being connected together through the whole of the set of resistances 15. In this position of the controlling switch, the induction motor will run at a slow speed. By moving the controlling switch 5 into position B, part of the set of resistances 15 is short-circuited so that the amount of resistance in series with the rotor winding 8 is reduced and the motor will then operate at a higher speed. When the switch 5 is moved into position C, all of the set of resistances 15 is short-circuited and the motor will run at a higher speed. If it is now desired to brake the motor, the controlling switch 6 is moved into position A' and the controlling switch 5 is preferably moved back into position A. In this position of the controlling switch 6, the primary winding 2 is connected to the direct current source 4 and, as shown, one leg of the winding 2 is connected in series with the other two legs in multiple. The secondary winding 9 in this position of the controller is connected together through the whole of the set of resistances 16, and operates as an armature winding of an alternating current generator. The current generated flows through the winding 9 and the non-inductive resistances 16 and develops a back torque proportional to $$\frac{e^2 r}{x^2 + r^2},$$

in which $e$ is the generated electromotive force, $x$ is the total reactance of the circuit and $r$ is the total resistance of the circuit. Since in this position of the controller, $r$ is relatively large, the back torque is small. In order to further brake the motor, the controlling switch 5 is moved to the off position thus disconnecting the winding 1 from the alternating current source 3, and with the controlling switch 6 still in position A', the only tendency that exists to rotate the motor is that due to the kinetic energy of the motor or of the masses driven thereby. This tendency to rotate the motor is opposed by the back or braking torque of the winding 9. By moving the controlling switch 6 into position B', part of the set of resistances 16 is short-circuited, and consequently $r$, in the expression for back torque given above, is reduced, thus increasing the braking torque. With the switch 6 in position C', still more of the set of resistances 16 is short-circuited and the braking torque is still further increased. As the motor slows down the generated voltage $e$ and the reactance $x$ in the above expression both decrease in value, and in case my system of control is used for lowering an unbalanced hoist, it will be necessary to use a mechanical brake which will come into action either to stop the motor when it has slowed down to a predetermined speed, or to hold the motor stationary after it has stopped.

From the description of the operation of the motor illustrated, it will be seen that the transition is made from normal induction motor running to electrical braking without allowing the motor to lose torque and consequently there is no danger of the motor speeding up during the transition due to any unbalanced load that it might be driving, such as lowering a hoist.

Although I have only illustrated the controlling switches 5 and 6 as being provided with three positions, I desire it to be understood that any number of positions may be provided. Furthermore, although I have described the windings of the motor as having eight poles and ten poles respectively, it is well understood that these windings may have any different number of poles, and I aim in the appended claims to cover such modifications as well as any others which do not depart from the spirit and scope of my invention.

What I claim as new and desire to secure by Letters Patent of the United States, is:—

1. In combination, an alternating current source, a direct current source, an induction motor having a primary and a secondary member, said primary member being provided with two windings of different pole numbers, said secondary member being provided with two windings of corresponding pole numbers, means for connecting said alternating current source to one of the primary windings, means for connecting said direct current source to the other primary winding, and means for varying the resistances of the circuits of the windings on said secondary member.

2. In combination, an alternating current source, a direct current source, an induction motor having a primary and a secondary member, said primary member being provided with two windings of different pole numbers, said secondary member being provided with two windings of corresponding pole numbers, sets of resistances, means for connecting said alternating current source to one of the primary windings and one of said sets of resistances to one of the secondary windings, and a second means for connecting said direct current source to the other of said primary windings and the other set of resistances to the other of the secondary windings.

3. The method of operating an induction motor having two windings of different pole numbers on one of its members which consists in supplying alternating current to one of said windings for normal operation, then supplying direct current to the other of said windings for braking, and finally disconnecting said alternating current source from said first mentioned winding.

4. The method of operating an induction motor having two windings of different pole numbers on each of its members which consists in supplying alternating current to one of said primary windings for normal operation, then supplying direct current to the other of said primary windings for braking, then disconnecting said alternating current source from said first mentioned winding, and finally varying the resistance of the circuit of one of the secondary windings of said motor to vary the braking speed of said motor.

In witness whereof, I have hereunto set my hand this 29th day of January, 1915.

KARL A. PAULY.

Witnesses:
BENJAMIN B. HULL,
HELEN ORFORD.